(12) United States Patent
Ye et al.

(10) Patent No.: US 11,209,719 B2
(45) Date of Patent: Dec. 28, 2021

(54) TERMINAL DEVICE, FOCUSING METHOD, AND FOCUSING APPARATUS

(71) Applicant: Huawei Technologies Co., Ltd., Shenzhen (CN)

(72) Inventors: Haishui Ye, Shanghai (CN); Tingting Xu, Shanghai (CN); Chi Chen, Shenzhen (CN); Jingfei Ye, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/341,606

(22) PCT Filed: May 10, 2017

(86) PCT No.: PCT/CN2017/083678
§ 371 (c)(1),
(2) Date: Apr. 12, 2019

(87) PCT Pub. No.: WO2018/068505
PCT Pub. Date: Apr. 19, 2018

(65) Prior Publication Data
US 2019/0361321 A1 Nov. 28, 2019

(30) Foreign Application Priority Data
Oct. 13, 2016 (CN) .......................... 201610896376.4

(51) Int. Cl.
G03B 13/34 (2021.01)
G03B 13/20 (2021.01)
(Continued)

(52) U.S. Cl.
CPC ............ *G03B 13/34* (2013.01); *G03B 13/20* (2013.01); *H04N 5/2254* (2013.01); *H04N 5/23212* (2013.01)

(58) Field of Classification Search
CPC ...... G03B 13/34; G03B 13/20; H04N 5/2254; H04N 5/23212; H04N 5/232121
See application file for complete search history.

(56) References Cited

U.S. PATENT DOCUMENTS 8,988,586 B2* 3/2015 McKinley ............ H04N 5/2253
348/345
2007/0025715 A1 2/2007 Lin
(Continued)

FOREIGN PATENT DOCUMENTS

CN 1904713 A 1/2007
CN 201044464 Y 4/2008
(Continued)

OTHER PUBLICATIONS

Machine Translation and Abstract of Chinese Publication No. CN105204269, Dec. 30, 2015, 12 pages.
(Continued)

Primary Examiner — Christopher E Mahoney
(74) Attorney, Agent, or Firm — Conley Rose, P.C.

(57) ABSTRACT

A terminal includes a camera, a laser transceiver, a protection glass, and an infrared cut-off coating. The camera includes an image sensor and N lenses; the image sensor is disposed at the rear of the N lenses, and is configured to: receive an optical signal penetrating the protection glass and the N lenses, and convert the optical signal into an electrical signal. The protection glass is disposed in front of the N lenses, and is configured to protect the N lenses. The laser transceiver is configured to transmit or receive a laser. The infrared cut-off coating is located on at least one surface of the protection glass and/or on at least one surface of at least one lens in the N lenses, and a cut-off wavelength of the infrared cut-off coating is corresponding to a center wavelength of the laser transmitted by the laser transceiver.

20 Claims, 6 Drawing Sheets

(51) Int. Cl.
*H04N 5/225* (2006.01)
*H04N 5/232* (2006.01)

(56) References Cited

U.S. PATENT DOCUMENTS

| | | | | |
|---|---|---|---|---|
| 2015/0253477 | A1* | 9/2015 | Nakao | H01L 27/14618 348/294 |
| 2016/0037034 | A1* | 2/2016 | Inasaki | C07F 7/1804 348/360 |
| 2018/0180841 | A1* | 6/2018 | Fransson | G02B 7/285 |
| 2019/0094360 | A1* | 3/2019 | Huang | G01S 7/4813 |

FOREIGN PATENT DOCUMENTS

| | | |
|---|---|---|
| CN | 203455567 U | 2/2014 |
| CN | 204131599 U | 1/2015 |
| CN | 104748721 A | 7/2015 |
| CN | 105009562 A | 10/2015 |
| CN | 105163034 A | 12/2015 |
| CN | 105204269 A | 12/2015 |
| CN | 205105308 U | 3/2016 |
| CN | 105554363 A | 5/2016 |
| CN | 105812652 A | 7/2016 |
| CN | 105827905 A | 8/2016 |
| CN | 105872378 A | 8/2016 |
| EP | 2946547 B1 | 3/2019 |
| JP | H08248443 A | 9/1996 |
| KR | 20150114199 A | 10/2015 |

OTHER PUBLICATIONS

Machine Translation and Abstract of Chinese Publication No. CN105554363, May 4, 2016, 31 pages.
Machine Translation and Abstract of Chinese Publication No. CN105812652, Jul. 27, 2016, 20 pages.
Machine Translation and Abstract of Chinese Publication No. CN105872378, Aug. 17, 2016, 13 pages.
Machine Translation and Abstract of Chinese Publication No. CN203455567, Feb. 26, 2014, 5 pages.
Machine Translation and Abstract of Japanese Publication No. JPH08248443, Sep. 27, 1996, 7 pages.
Foreign Communication From A Counterpart Application, PCT Application No. PCT/CN2017/083678, English Translation of International Search Report dated Jul. 24, 2017, 4 pages.
Foreign Communication From A Counterpart Application, PCT Application No. PCT/CN2017/083678, English Translation of Written Opinion dated Jul. 24, 2017, 5 pages.
Machine Translation and Abstract of Chinese Publication No. CN105163034, Dec. 16, 2015, 22 pages.
Machine Translation and Abstract of Korean Publication No. KR20150114199, Oct. 12, 2015, 16 pages.
Foreign Communication From A Counterpart Application, European U.S. Appl. No. 17/860,755 2, Extended European Search Report dated Sep. 25, 2019, 7 pages.
Machine Translation and Abstract of Chinese Publication No. CN104748721, Jul. 1, 2015, 11 pages.
Machine Translation and Absliact of Chinese Publication No. CN105827905, Aug. 3, 2016, 8 pages.
Machine Translation and Abstract of Chinese Publication No. CN205105308, Mar. 23, 2016, 11 pages.
Liu, Y., "Digital camera purchase, use and digital image processing guide," Zhejiang Science and Technology Press, Jun. 1999, 5 pages.
Wang, Y., "Design and application of film," Aug. 31, 2016, 7 pages.
Foreign Communication From A Counterpart Application, Chinese Application No. 201780009441.X, Chinese Office Action dated Aug. 20, 2019, 10 pages.

* cited by examiner

TERMINAL DEVICE, FOCUSING METHOD, AND FOCUSING APPARATUS

CROSS-REFERENCE TO RELATED APPLICATIONS

This application is a national stage of International Application No. PCT/CN2017/083678, filed on May 10, 2017, which claims priority to Chinese Patent Application No. 201610896376.4, filed on Oct. 13, 2016. Both of the aforementioned applications are hereby incorporated by reference in their entireties.

TECHNICAL FIELD

Embodiments of this application relate to the field of intelligent terminal technologies, and in particular, to a terminal device, a focusing method, and a focusing apparatus.

BACKGROUND

With gradual innovation of an intelligent terminal, the intelligent terminal has become increasingly popular in daily life, and demands of people on the intelligent terminal in delivering experience of taking pictures and an artistic effect of photography are increasing. A laser-assisted focusing technology has emerged in an intelligent terminal focusing technology.

Generally, an intelligent terminal having a laser-assisted focusing function includes a camera and a laser focusing module beside the camera. In the laser-assisted focusing technology, the laser focusing module beside the camera may transmit a conical laser beam when the intelligent terminal performs photographing and in a focusing process. The laser beam is usually an infrared wavelength laser beam. The intelligent terminal may calculate a distance between the intelligent terminal and a photographed object according to a time in which the laser beam is reflected, quickly lock a focus according to the distance to the photographed object, and then complete focusing. However, when a highly reflective object is photographed, the laser beam may go into the camera after being reflected on a surface of the object. Therefore, a red spot is formed in a finally photographed picture, and is referred to as a red laser spot. A red laser spot phenomenon is extremely obvious in a weak light photographing environment, and seriously affects photographing quality of the intelligent terminal.

At present, there is no effective solution to resolving the red laser spot phenomenon, and the red laser spot phenomenon is an urgent problem that needs to be resolved.

SUMMARY

Embodiments of this application provide a terminal device, a focusing method, and a focusing apparatus, so as to eliminate a red laser spot phenomenon and improve photographing quality.

According to a first aspect, an embodiment of this application provides a focusing method. The focusing method may include: receiving a focusing instruction; opening, according to the focusing instruction, a laser transceiver to transmit a laser, and receiving a laser returned after reflection; obtaining a time difference between the transmitted laser and the received laser, and determining a distance between a terminal device and a photographed object according to the time difference; determining an image distance of a camera according to the distance, and determining a lens displacement of the camera according to the image distance; driving, according to the lens displacement, a lens of the camera to move, so as to complete focusing; closing the laser transceiver; and receiving a photographing instruction, and performing photographing according to the photographing instruction to obtain a picture.

According to the focusing method provided in the first aspect, photographing may be completed in a non-laser environment by closing laser transmission of the laser transceiver after focusing is completed. This eliminates the red laser spot phenomenon and improves photographing quality.

Optionally, in a possible implementation of the first aspect, before the closing the laser transceiver, the focusing method may further include: if the focusing is not completed, opening the laser transceiver to continue to transmit a laser and perform laser focusing until the focusing is completed.

Optionally, in a possible implementation of the first aspect, the focusing method may further include: receiving a picture withdrawal instruction, where the picture withdrawal instruction is used to instruct not to store the picture.

Optionally, in a possible implementation of the first aspect, the focusing method may further include: receiving a recording instruction, and performing recording according to the recording instruction to obtain a video.

According to a second aspect, an embodiment of this application provides a focusing apparatus. The apparatus may include a receiving module and a processing module. The receiving module is configured to receive a focusing instruction. The processing module is configured to: open, according to the focusing instruction, a laser transceiver to transmit a laser, and receive a laser returned after reflection; obtain a time difference between the transmitted laser and the received laser, and determine a distance between a terminal device and a photographed object according to the time difference; determine an image distance of a camera according to the distance, and determine a lens displacement of the camera according to the image distance; drive, according to the lens displacement, a lens of the camera to move, so as to complete focusing; and close the laser transceiver. The receiving module is further configured to receive a photographing instruction. The processing module is further configured to perform photographing according to the photographing instruction to obtain a picture.

Optionally, in a possible implementation of the second aspect, the processing module is further configured to: if the focusing is not completed, open the laser transceiver to continue to transmit a laser and perform laser focusing until the focusing is completed.

Optionally, in a possible implementation of the second aspect, the receiving module is further configured to receive a picture withdrawal instruction, where the picture withdrawal instruction is used to instruct not to store the picture.

Optionally, in a possible implementation of the second aspect, the receiving module is further configured to receive a recording instruction; and the processing module is further configured to perform recording according to the recording instruction to obtain a video.

According to a third aspect, an embodiment of this application provides a terminal device, where the terminal device may include a camera, a laser transceiver, a protection glass, and an infrared cut-off coating; the camera includes an image sensor and N lenses, where N is greater than or equal to 1; the image sensor is disposed at the rear of the N lenses, and is configured to: receive an optical signal penetrating the protection glass and the N lenses, and convert the optical signal into an electrical signal; the protection glass is disposed in front of the N lenses, and is configured to protect the N lenses; the laser transceiver is configured to transmit or receive a laser; and the infrared cut-off coating is located on at least one surface of the protection glass and/or on at least one surface of at least one lens in the N lenses, and a cut-off wavelength of the infrared cut-off coating is corresponding to a center wavelength of the laser transmitted by the laser transceiver.

According to the terminal device provided in the third aspect, the infrared cut-off coating is disposed in the terminal device. The infrared cut-off coating may be disposed only on the protection glass, may be disposed only on the lens, or may be disposed on both the protection glass and the lens. The cut-off wavelength of the infrared cut-off coating is corresponding to the center wavelength of the laser transmitted by the laser transceiver. Therefore, a laser that is on an infrared band and that arrives at the image sensor after penetrating the protection glass and the lens may be filtered, so as to weaken a red laser spot phenomenon and improve photographing quality.

Optionally, in a possible implementation of the third aspect, the infrared cut-off coating covering the at least one surface of the protection glass and/or covering the at least one surface of the at least one lens in the N lenses is multi-layer.

According to the terminal device provided in the possible implementation, the infrared cut-off coating is multi-layer. This may further improve an effect of filtering the laser on the infrared band and further weaken the red laser spot phenomenon.

Optionally, in a possible implementation of the third aspect, the cut-off wavelength of the infrared cut-off coating is greater than or equal to 780 nm, and is less than or equal to 1100 nm.

Optionally, in a possible implementation of the third aspect, the cut-off wavelength of the infrared cut-off coating is 840 nm or 900 nm.

Optionally, in a possible implementation of the third aspect, a transmittance of the infrared cut-off coating on a near-infrared band is equal to or less than IV.

According to the terminal device provided in the possible implementation, the transmittance of the infrared cut-off coating on the near-infrared band is equal to or less than $10^{-3}$. This may further improve the effect of filtering the laser on the infrared band and further weaken the red laser spot phenomenon.

According to a fourth aspect, an embodiment of this application provides a terminal device, where the terminal device may include a camera, a laser transceiver, and an infrared cut-off coating; the camera includes an image sensor, an infrared cut-off filter, and a lens, where the infrared cut-off filter is located between the image sensor and the lens; the image sensor is configured to: receive an optical signal penetrating the lens and the infrared cut-off filter, and convert the optical signal into an electrical signal; the laser transceiver is configured to transmit or receive a laser; and the infrared cut-off coating is located on at least one surface of the infrared cut-off filter, and a cut-off wavelength of the infrared cut-off coating is corresponding to a center wavelength of the laser transmitted by the laser transceiver.

According to the terminal device provided in the fourth aspect, the infrared cut-off coating is disposed in the terminal device, and the infrared cut-off filter is disposed in the camera. The infrared cut-off coating may be disposed on the infrared cut-off filter. The cut-off wavelength of the infrared cut-off coating is corresponding to the center wavelength of the laser transmitted by the laser transceiver. Therefore, a laser that is on an infrared band and that arrives at the image sensor after penetrating the lens and the infrared cut-off filter may be filtered, so as to weaken the red laser spot phenomenon and improve the photographing quality.

Optionally, in a possible implementation of the fourth aspect, if the infrared cut-off coating covers only one surface of the infrared cut-off filter, the infrared cut-off coating covering the only one surface is an IR coating; and if infrared cut-off coatings cover two surfaces of the infrared cut-off filter, the infrared cut-off coatings covering the two surfaces are respectively the IR coating and an AR coating, or are both IR coatings.

Optionally, in a possible implementation of the fourth aspect, the infrared cut-off coating covering the at least one surface of the infrared cut-off filter is multi-layer.

According to the terminal device provided in the possible implementation, the infrared cut-off coating is multi-layer. This may further improve an effect of filtering the laser on the infrared band and further weaken the red laser spot phenomenon.

Optionally, in a possible implementation of the fourth aspect, the infrared cut-off coating covers at least one surface of the lens.

Optionally, in a possible implementation of the fourth aspect, a transmittance of the infrared cut-off coating on a near-infrared band is equal to or less than $10^{-3}$.

According to the terminal device provided in the possible implementation, the transmittance of the infrared cut-off coating on the near-infrared band is equal to or less than $10^{-3}$. This may further improve the effect of filtering the laser on the infrared band and further weaken the red laser spot phenomenon.

Optionally, in a possible implementation of the third aspect, the cut-off wavelength of the infrared cut-off coating is greater than or equal to 780 nm, and is less than or equal to 1100 nm.

Optionally, in a possible implementation of the third aspect, the cut-off wavelength of the infrared cut-off coating is 840 nm or 900 nm.

According to a fifth aspect, this application further provides a program, where the program is used to perform the method according to the foregoing first aspect or any possible implementation of the first aspect when the program is executed by a processor.

According to a sixth aspect this application further provides a program product, for example, a computer readable storage medium, which includes the program in the fifth aspect.

According to a seventh aspect, this application further provides a computer readable storage medium, where the computer readable storage medium stores an instruction. When the instruction runs in a computer, the computer performs the method according to the foregoing first aspect or any possible implementation of the first aspect.

The embodiments of this application provide a terminal device, a focusing method, and a focusing apparatus, where the infrared cut-off coating is disposed in the terminal device. The cut-off wavelength of the infrared cut-off coating is corresponding to the center wavelength of the laser transmitted by the laser transceiver Therefore, a laser on an infrared band may be filtered, so as to weaken the red laser spot phenomenon and improve the photographing quality.

DESCRIPTION OF EMBODIMENTS

Figure 1:
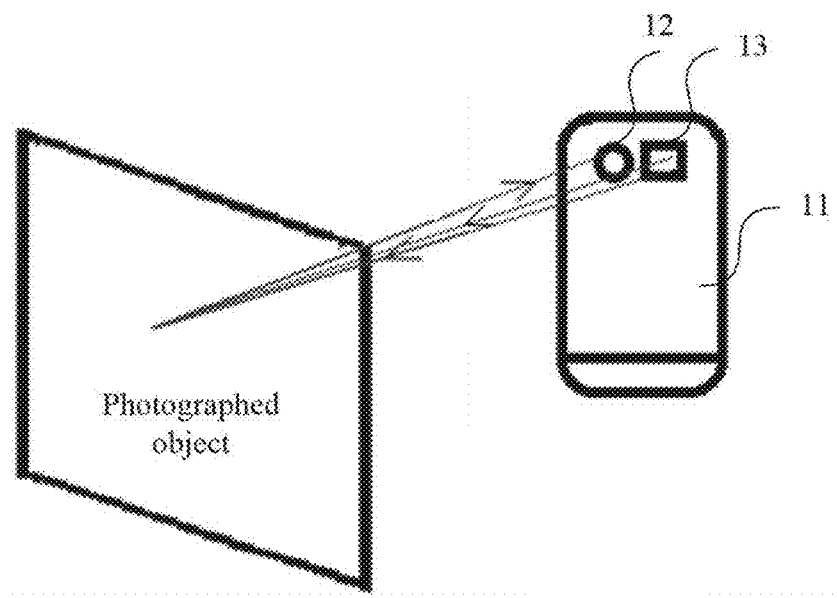
FIG. 1 is a schematic diagram of a scenario to which embodiments of this application are applied.
Figure 2:
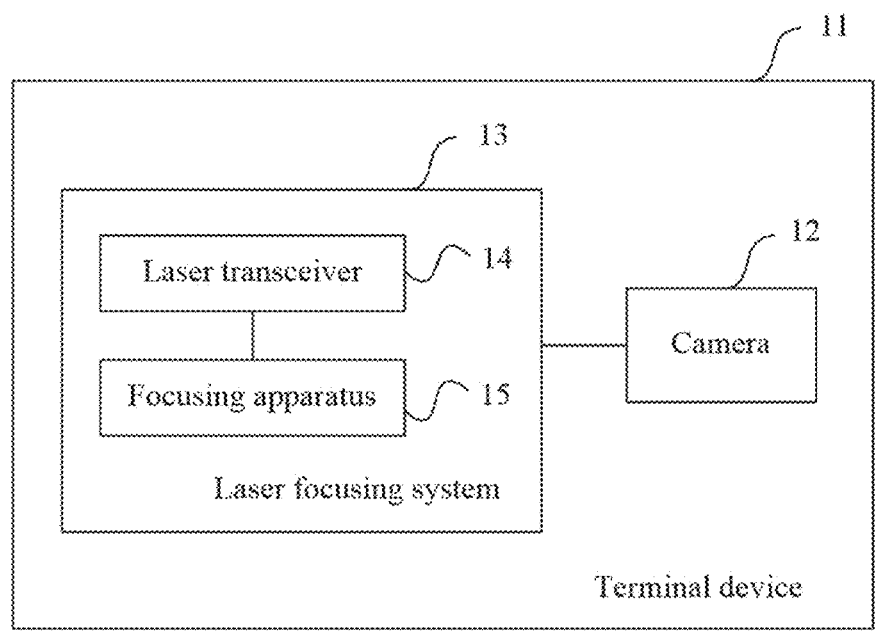
FIG. 2 is a schematic structural diagram of a terminal device to which embodiments of this application are applied.

FIG. 1 is a schematic diagram of a scenario to which embodiments of this application are applied. FIG. 2 is a schematic structural diagram of a terminal device to which embodiments of this application are applied. The scenario and the terminal device are also applicable to the prior art. The terminal device has a laser focusing function.

As shown in FIG. 2, a terminal device 11 having the laser focusing function may include a laser focusing system 13 and a camera 12. The laser focusing system 13 and the camera 12 are adjacently disposed in the terminal device 11. The laser focusing system 13 may include a laser transceiver 14 and a focusing apparatus 15. The laser transceiver 14 may be configured to transmit and receive lasers. The focusing apparatus 15 may be configured to control the laser transceiver 14 to operate properly, and configured to perform another control function in a laser focusing process.

It should be noted that a name of each module in FIG. 2 is merely an example, and may be another name. For example, the laser focusing system 13 may also be referred to as a laser focusing module, and the camera 12 may also be referred to as a camera module.

Figure 3:
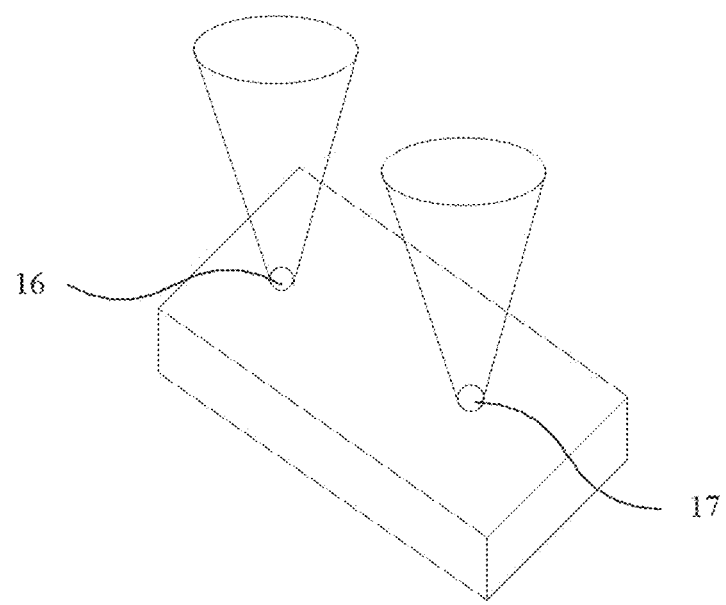
FIG. 3 is a schematic structural diagram of a laser transceiver.
Figure 4:
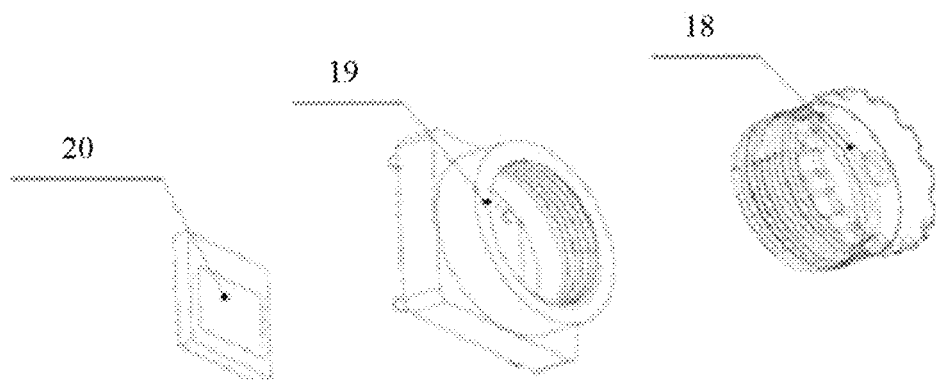
FIG. 4 is a schematic structural diagram of a camera.

It should be noted that a specific implementation of each module in FIG. 2 is not limited. The laser transceiver is used as an example. As an implementation, FIG. 3 is a schematic structural diagram of a laser transceiver. As shown in FIG. 3, the laser transceiver has a laser transmitting module 16 and a laser receiving module 17. The laser transmitting module 16 is configured to transmit a laser, and the laser receiving module 17 is configured to receive a laser. As another implementation, the laser transceiver may have only one laser transceiving window. The camera is used as an example. As an implementation, FIG. 4 is a schematic structural diagram of a camera. As shown in FIG. 4, the camera may include devices such as a lens 18, a motor 19, and an image sensor 20. The motor 19 is at the rear of the lens 18, and is configured to drive the lens 18 to move in a photographing process, so as to implement automatic focusing. As a photosensitive element, the image sensor 20 is at the rear of the motor 19, and may convert an optical signal into an electrical signal. The lens 18 may include at least one lens, and the lens may be an aspheric lens.

Figure 5:
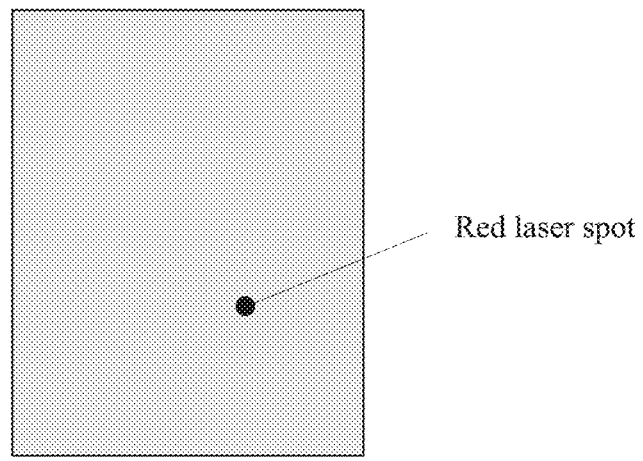
FIG. 5 is a schematic diagram of a picture including a red laser spot.

For an existing laser focusing method, refer to FIG. 1 to FIG. 3. After a laser transmitted by the laser transmitting module 16 arrives at a photographed object, a laser reflected on a surface of the photographed object is received by the laser receiving module 17. A distance to the photographed object may be calculated by using a time difference between laser transmitting time and laser receiving time, and a speed of light. The distance is used to provide a corresponding motor movement amount for the camera 12 to focus quickly and automatically, thereby implementing automatic focusing. The laser is usually on a near-infrared band. However, when a picture is taken, both the laser focusing system 13 and the camera 12 operate. A near-infrared beam transmitted by the laser transceiver 14 may go into the camera 12 after being reflected on the surface of the object. A red laser spot may be formed on a target surface of the image sensor, and is referred to as the red laser spot. FIG. 5 is a schematic diagram of a picture including a red laser spot. As shown in FIG. 5, a finally photographed picture may include the red laser spot. A red laser spot phenomenon is extremely obvious especially when a highly reflective object is photographed, or in a short distance and weak light photographing environment, or in a scenario in which a laser transmitting power needs to be increased with the increase of a focusing distance. This seriously affects photographing quality of the terminal device 11.

The following lists some existing focusing methods.

The invention patent with a publication number CN105554363A discloses a laser-assisted automatic focusing method and apparatus. The method describes a specific implementation of a laser-assisted focusing process. In the method, a laser pulse transceiver may be rotated, according to requirements of a user, for different focusing locations, so as to implement laser-assisted automatic focusing for the different focusing locations. This improves automatic focusing photographing experience of the user. However, no solution is provided for analyzing the red laser spot phenomenon and eliminating a disadvantage of the red laser spot phenomenon.

The invention patent with a publication number CN105204269A discloses a laser-assisted focusing method and a photographing apparatus. The solution includes two modules: a laser rangefinder and a lens. A focusing speed is improved by establishing a correspondence between a lens photographing distance parameter and a lens movement range value. In addition, a focusing accuracy in a weak light environment is improved. However, the red laser spot phenomenon that appears in a weak light photographing environment is not involved in the technical solution, and no solution is provided for eliminating a disadvantage of the red laser spot phenomenon.

The invention patent with a publication number CN203455567U discloses a laser-head-assisted focusing apparatus for a camera. In the technical solution, at least two laser heads, an independent camera, and a corresponding signal processing module are used, and features such as quick focusing and a long service life are provided. The technical solution can be used for scene photographing in a dark or insufficient light environment, and features a fast focusing speed, a simple apparatus structure, and the like. How ever, the red laser spot phenomenon that appears in a picture photographed in the weak light environment is not researched.

An objective of the focusing method, the focusing apparatus, and the terminal device provided in the embodiments of this application is to resolve the red laser spot phenomenon that currently exists in the prior art.

The terminal device in the embodiments of this application may be an intelligent terminal device that has a photographing function and a laser focusing function, such as a mobile phone, a tablet computer, a notebook computer, a palmtop computer, a mobile Internet device (mobile Internet device, MID), and a vehicular device. This is not limited in the embodiments of this application.

The following describes in detail, by using specific embodiments, the technical solution of this application and how the foregoing technical problem is resolved in the technical solution of this application. The following several specific embodiments may be combined with each other, and a same or similar concept or process may not be described repeatedly in some embodiments.

Figure 6:
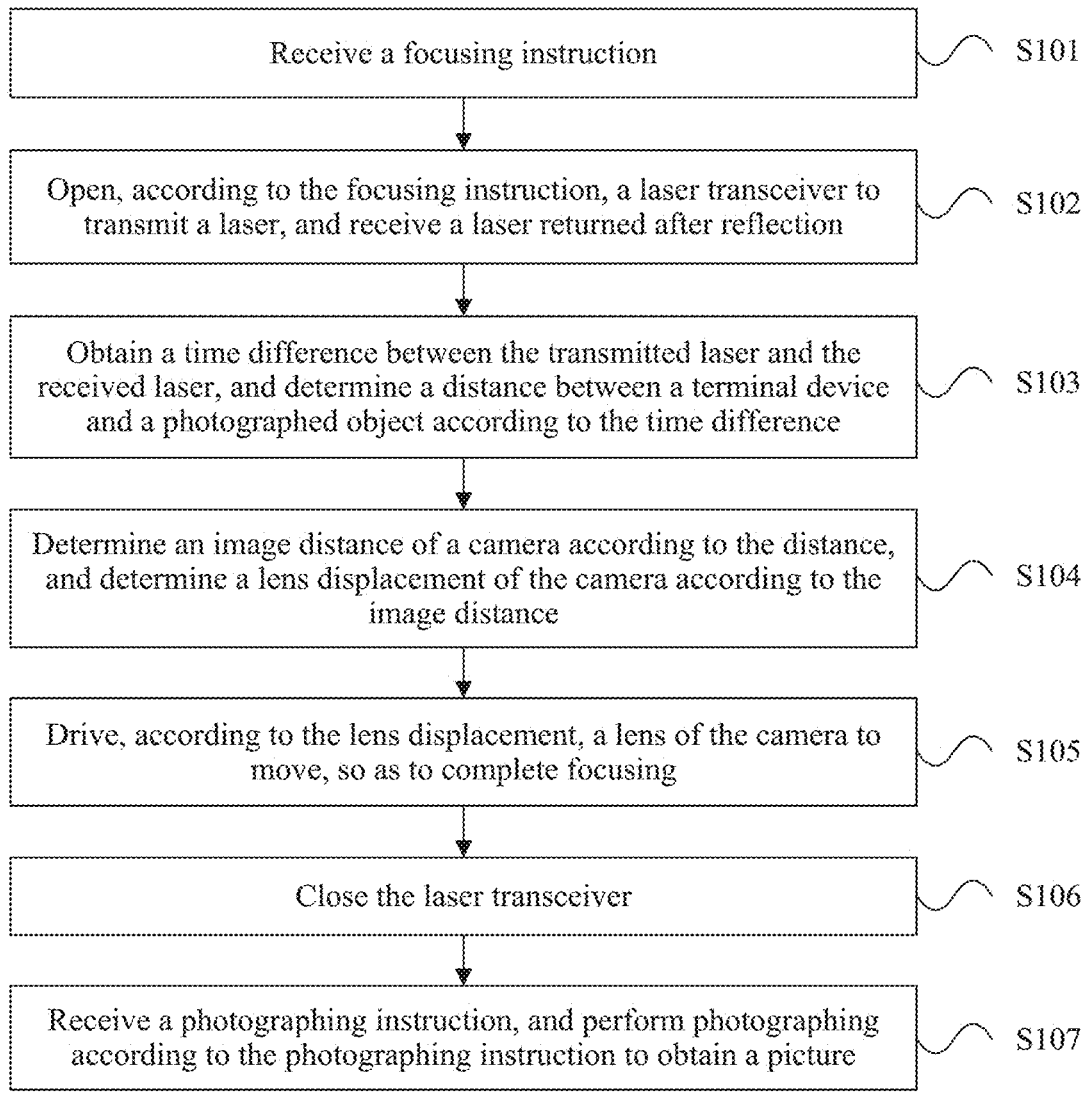
FIG. 6 is a flowchart of a focusing method according to an embodiment of this application.

FIG. 6 is a flowchart of a focusing method according to an embodiment of this application. The focusing method in this embodiment of this application may be performed by a focusing apparatus. The focusing apparatus may be integrated into a terminal device that has a photographing function and a laser focusing function. As shown in FIG. 6, the focusing method provided in this embodiment of this application may include the following steps.

S101. Receive a focusing instruction.

Specifically, the focusing instruction is input by a user, and is used to instruct a terminal device to perform a focusing process before taking a picture. After the focusing instruction is received, automatic focusing is performed.

It should be noted that a specific implementation of the focusing instruction is not limited in this embodiment of this application. The user may send the focusing instruction by using a push-button or through touch control, sound control, or the like. For example, the focusing instruction may be that the user touches a camera icon on a desktop of the terminal device to start a camera and perform focusing, or the user touches the camera icon in a picture library of the terminal device to start the camera and perform focusing, or the user starts the camera and performs focusing by using a push-button or a sound when a screen of the terminal device is locked, or the user starts the camera and performs focusing by performing a user-defined gesture operation on the desktop of the terminal device, or the user needs to perform focusing when pressing a button to return to take a picture after photographing, or the user touches and holds a photographing button after starting the camera for focusing, or the like.

Optionally, before S101, the method provided in this embodiment may further include:

receiving a laser focusing enabling instruction to activate the laser focusing function.

Specifically, the laser focusing function means that the terminal device may perform, in a photographing process, focusing with the assistance of a laser transmitted by a laser transceiver. The laser focusing enabling instruction is used to instruct the terminal device to enable the laser focusing function. The user may set the terminal device to enable the laser focusing function. Correspondingly, the focusing apparatus receives the laser focusing enabling instruction to activate the laser focusing function. In this way, the terminal device may perform, in the photographing process, focusing by using the laser transmitted by the laser transceiver. A laser focusing closing instruction may be corresponding to the laser focusing enabling instruction, and is used to instruct the terminal device to disable the laser focusing function. When the terminal device disables the laser focusing function, any existing focusing method may be used in the photographing process, for example, contrast focusing and phase focusing. The contrast focusing means that a plurality of pictures are taken near a focus when a camera performs focusing, and a state in which a contrast ratio (contrast) of an object image is largest is selected as an optimal focusing location of a motor. This process is referred to as the contrast focusing. The phase focusing means that some masking pixels are reserved in an image sensor to detect light intensity information of an object, and an optimal focusing location is calculated by calculating a correlation value among pixels, so that a motor quickly pushes a lens to the optimal focusing location. This process is referred to as the phase focusing.

S102. Open, according to the focusing instruction, a laser transceiver to transmit a laser, and receive a laser returned after reflection.

S103. Obtain a time difference between the transmitted laser and the received laser, and determine a distance between a terminal device and a photographed object according to the time difference.

S104. Determine an image distance of a camera according to the distance, and determine a lens displacement of the camera according to the image distance.

S105. Drive, according to the lens displacement, a lens of the camera to move, so as to complete focusing.

In this embodiment of this application, any existing laser focusing method may be used to perform laser focusing, and this is not limited in this embodiment of this application.

It should be noted that a criterion for determining completion of focusing is not limited in this embodiment of this application, and may vary according to different focusing methods. For example, an implementation may be determining whether a tested scene is detected. If the tested scene is detected, it is determined that focusing is completed; or if the tested scene is not detected, it is determined that the focusing is not completed. Another implementation may be determining whether a movement distance of the lens is equal to the lens displacement. If the movement distance of the lens is equal to the lens displacement, focusing is completed; or if the movement distance of the lens is not equal to the lens displacement, the focusing is not completed.

S106. Close the laser transceiver.

Specifically, when focusing is completed, it indicates that a to-be-photographed scene may be clearly imaged, and the terminal device may obtain a clear picture. In this case, the laser transceiver is closed and stops transmitting a laser. In this way, when a picture is taken, only the camera operates, and the laser transceiver no longer operate. Therefore, no laser goes into the to-be-photographed scene, and no laser reflected by the to-be-photographed scene goes into the camera, which leads to a red laser spot and affects quality of the picture.

S107. Receive a photographing instruction, and perform photographing according to the photographing instruction to obtain a picture.

Specifically, the photographing instruction is an action that is input by the user and that is used to instruct the terminal device to begin to take a picture. Correspondingly, the focusing apparatus receives the photographing instruction to perform photographing and obtain a picture of the to-be-photographed scene. In this case, the laser transceiver has stopped transmitting a laser. Therefore, a red laser spot that appears when the to-be-photographed scene reflects the laser transmitted by the laser transceiver does not exist in the obtained picture, thereby eliminating a red laser spot phenomenon.

It should be noted that a specific implementation of the photographing instruction is not limited in this embodiment of this application. The user may send the photographing instruction by using a push-button or through touch control, sound control, or the like. For example, after the terminal device starts the camera, the photographing instruction may be that the user touches a photographing button to take a picture, or the user touches any position of a screen to take a picture, or the user releases the photographing button after touching and holding the photographing button to take a picture, or the like.

It can be learned that according to the focusing method provided in this embodiment of this application, when the photographing instruction is received, photographing may be completed by closing laser transmission of the laser transceiver after focusing is completed and in a non-laser environment to obtain the picture. No laser is transmitted during photographing, and therefore, no laser is reflected into the picture. This eliminates the red laser spot phenomenon, improves photographing quality, and further improves satisfaction of the user on the picture.

Optionally, before S106, the focusing method provided in this embodiment of this application may further include:

if the focusing is not completed, opening the laser transceiver to continue to transmit a laser and perform laser focusing until the focusing is completed.

Specifically, if the focusing is not completed, it indicates that the to-be-photographed scene cannot be clearly imaged in this case, and the terminal device cannot obtain the clear picture. Therefore, the laser transceiver needs to be opened to continue to transmit a laser and perform laser focusing. If the focusing is completed after the laser focusing, S106 may be performed; or if the focusing is not completed, the laser focusing needs to be continued until the focusing is completed.

Optionally, after S107, the focusing method provided in this embodiment of this application may further include:

receiving a picture withdrawal instruction, where the picture withdrawal instruction is used to instruct the terminal device not to store the picture;

or receiving a picture storage instruction to store the picture, where the picture storage instruction is used to instruct the terminal device to store the picture.

Specifically, after taking and obtaining the picture, the user may check whether the picture obtained after photographing meets a personal requirement. If the user determines that the picture does not meet the personal requirement, the user may send the picture withdrawal instruction, which is used to instruct the terminal device not to store the picture obtained after photographing. Then the user may send the focusing instruction and the photographing instruction again to perform photographing, so as to obtain a new picture. Correspondingly, the terminal device receives the picture withdrawal instruction, and may continue to receive the focusing instruction and perform S101-S107 again, so as to obtain the new picture. The user may re-check whether the new picture obtained after photographing meets the personal requirement. If the user determines that the new picture meets the personal requirement, the user may send the picture storage instruction, which is used to instruct the terminal device to store the new picture. Correspondingly, the terminal device receives the picture storage instruction to complete picture storage; or if the user determines that the new picture still cannot meet the personal requirement, the terminal device cyclically performs S101-S107 until the picture storage instruction is received.

It should be noted that specific implementations of the picture withdrawal instruction and the picture storage instruction are not limited in this embodiment of this application. The user may send the picture withdrawal instruction and the picture storage instruction by using a push-button or through touch control, sound control, or the like.

Optionally, the focusing method provided in this embodiment of this application may further include:

receiving a recording instruction, and performing recording according to the recording instruction to obtain a video.

Specifically, in a recording process, the laser transceiver is always in a closing state, and does not transmit a laser. In this way, the recording may be completed in a non-laser environment to obtain the video. There is no laser during recording, and therefore, no laser is reflected into the video. This eliminates the red laser spot phenomenon, improves recording quality, and further improves satisfaction of the user on the video.

This embodiment of this application provides a focusing method including: receiving a focusing instruction; opening, according to the focusing instruction, a laser transceiver to transmit a laser, and receiving a laser returned after reflection; obtaining a time difference between the transmitted laser and the received laser, and determining a distance between a terminal device and a photographed object according to the time difference; determining an image distance of a camera according to the distance, and determining a lens displacement of the camera according to the image distance; driving according to the lens displacement, a lens of the camera to move, so as to complete focusing; closing the laser transceiver; and receiving a photographing instruction, and performing photographing according to the photographing instruction to obtain a picture. According to the focusing method provided in this embodiment of this application, photographing may be completed in a non-laser environment by closing laser transmission of the laser transceiver after focusing is completed. This eliminates the red laser spot phenomenon and improves photographing quality.

Figure 7:
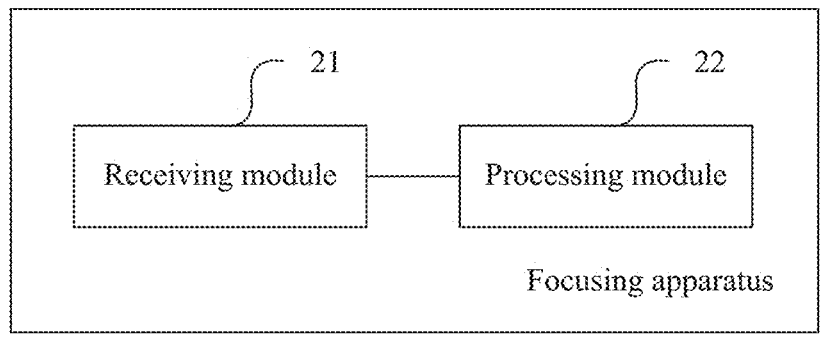
FIG. 7 is a schematic structural diagram of a focusing apparatus according to an embodiment of this application.

FIG. 7 is a schematic structural diagram of a focusing apparatus according to an embodiment of this application. The focusing apparatus provided in this embodiment of this application may be integrated into an intelligent terminal device that has a photographing function and a laser focusing function, and is configured to perform the focusing method provided in the embodiment shown in FIG. 6. As shown in FIG. 7, the focusing apparatus provided in this embodiment of this application may include:

a receiving module 21, configured to receive a focusing instruction;

a processing module 22, configured to: open, according to the focusing instruction, a laser transceiver to transmit a laser, and receive a laser returned after reflection; obtain a time difference between the transmitted laser and the received laser, and determine a distance between a terminal device and a photographed object according to the time difference; determine an image distance of a camera according to the distance, and determine a lens displacement of the camera according to the image distance; drive, according to the lens displacement, a lens of the camera to move, so as to complete focusing; and close the laser transceiver; where the receiving module 21 is further configured to receive a photographing instruction; and the processing module 22 is further configured to perform photographing according to the photographing instruction to obtain a picture.

Optionally, the processing module 22 is further configured to:

if the focusing is not completed, open the laser transceiver to continue to transmit a laser and perform laser focusing until the focusing is completed.

Optionally, the receiving module 21 is further configured to:

receive a picture withdrawal instruction, where the picture withdrawal instruction is used to instruct not to store the picture.

Optionally, the receiving module 21 is further configured to receive a recording instruction.

The processing module 22 is further configured to perform recording according to the recording instruction to obtain a video.

The focusing apparatus provided in this embodiment of this application is configured to perform the focusing method in the method embodiment shown in FIG. 6, and technical principles and technical effects of the apparatus are similar to those of the method embodiment and are not described herein again.

Figure 8:
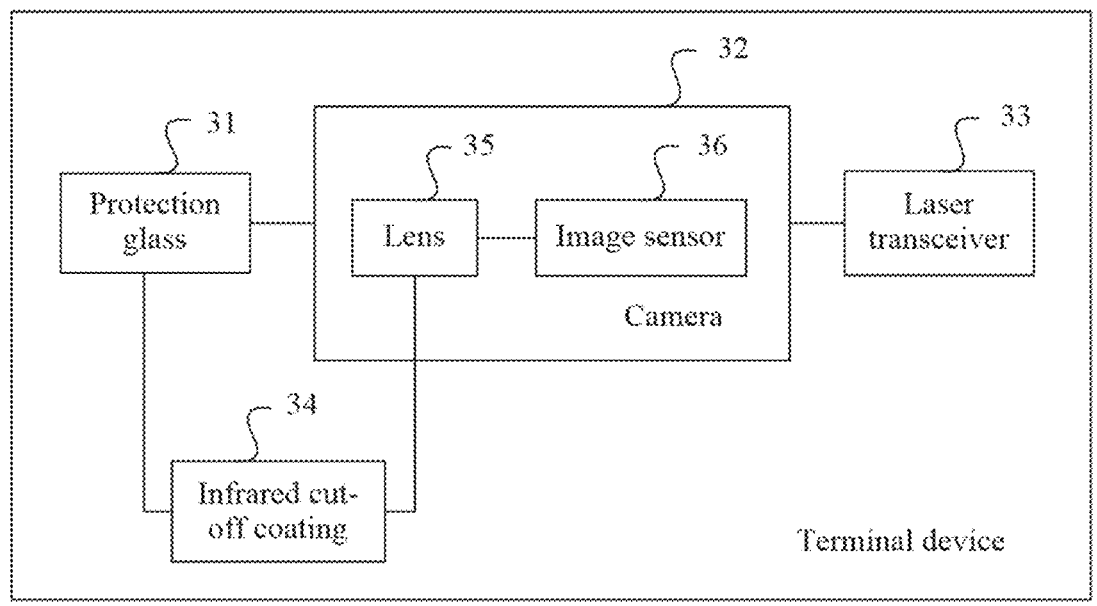
FIG. 8 is a schematic structural diagram of a terminal device according to Embodiment 1 of this application.
Figure 9:
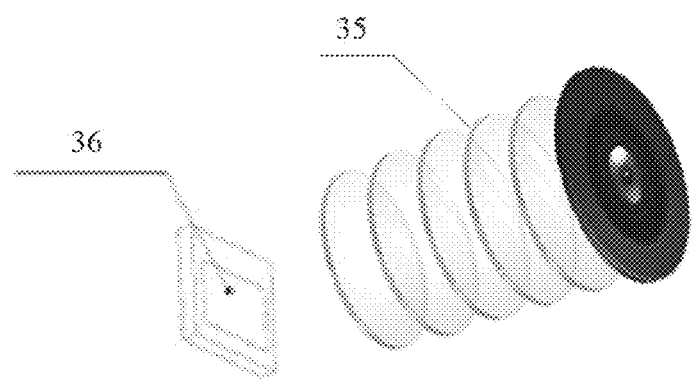
FIG. 9 is a schematic structural diagram of a camera according to Embodiment 1 of this application.

FIG. 8 is a schematic structural diagram of a terminal device according to Embodiment 1 of this application. FIG. 9 is a schematic structural diagram of a camera according to Embodiment 1 of this application. As shown in FIG. 8 to FIG. 9, the terminal device provided in this embodiment of this application may include a protection glass 31, a camera 32, a laser transceiver 33, and an infrared cut-off coating 34.

The camera 32 may include an image sensor 36 and N lenses 35, where N is greater than or equal to 1. The image sensor 36 is disposed at the rear of the N lenses 35, and is configured to: receive an optical signal penetrating the protection glass 31 and the N lenses 35, and convert the optical signal into an electrical signal.

The protection glass 31 is disposed in front of the N lenses 35, and is configured to protect the N lenses 35.

The laser transceiver 33 is configured to transmit or receive a laser.

The infrared cut-off coating 34 is located on at least one surface of the protection glass 31 and/or on at least one surface of at least one lens in the N lenses 35, and a cut-off wavelength of the infrared cut-off coating 34 is corresponding to a center wavelength of the laser transmitted by the laser transceiver 33.

Specifically, the infrared cut-off coating is disposed in the terminal device provided in this embodiment. The infrared cut-off coating may be disposed only on the protection glass, may be disposed only on the lens, or may be disposed on both the protection glass and the lens. In addition, the protection glass has two surfaces: an inner surface and an outer surface. The infrared cut-off coating may be disposed only on one surface of the protection glass, or may be disposed on both the inner surface and the outer surface of the protection glass. Each lens has two surfaces: an inner surface and an outer surface. The infrared cut-off coating may be disposed only on one surface of the lens, or may be disposed on both the inner surface and the outer surface of the lens. When there are a plurality of lenses, the infrared cut-off coating may be disposed on at least one lens. The cut-off wavelength of the infrared cut-off coating is corresponding to the center wavelength of the laser transmitted by the laser transceiver. Therefore, a laser that is on an infrared band and that arrives at the image sensor after penetrating the protection glass and the lens may be filtered, so as to weaken a red laser spot phenomenon.

It should be noted that a material and an implementation technology of the infrared cut-off coating 34 are not limited in this embodiment.

Optionally, the infrared cut-off coating 34 covering the at least one surface of the protection glass 31 and/or covering the at least one surface of the at least one lens in the N lenses 35 is multi-layer.

By disposing the multilayer infrared cut-off coating, an effect of filtering the laser on the infrared band may further be improved, and the red laser spot phenomenon is further weakened.

Optionally, the cut-off wavelength of the infrared cut-off coating 34 is greater than or equal to 780 nm, and is less than or equal to 1100 nm.

Optionally, the cut-off wavelength of the infrared cut-off coating 34 is 840 nm or 900 nm.

Optionally, a transmittance of the infrared cut-off coating 34 on a near-infrared band is equal to or less than $10^{-3}$.

By setting that the transmittance of the infrared cut-off coating on the near-infrared band to be equal to or less than $10^{-3}$, the effect of filtering the laser on the infrared band may further be improved, and the red laser spot phenomenon is further weakened.

Optionally, according to the terminal device provided in this embodiment, the camera may further include an infrared cut-off filter, and the infrared cut-off filter is located between the image sensor 36 and the lens 35. The infrared cut-off coating covers at least one surface of the infrared cut-off filter.

It should be noted that the terminal device provided in this embodiment may further include the focusing apparatus provided in the embodiment shown in FIG. 6.

This embodiment of this application provides a terminal device, including the camera, the laser transceiver, the protection glass, and the infrared cut-off coating, where the cut-off wavelength of the infrared cut-off coating is corresponding to the center wavelength of the laser transmitted by the laser transceiver. By disposing the infrared cut-off coating on the at least one surface of the protection glass and/or on the at least one surface of the lens, the laser that is on the infrared band and that arrives at the image sensor after penetrating the protection glass and the lens may be filtered. This weakens the red laser spot phenomenon and improves photographing quality.

Figure 10:
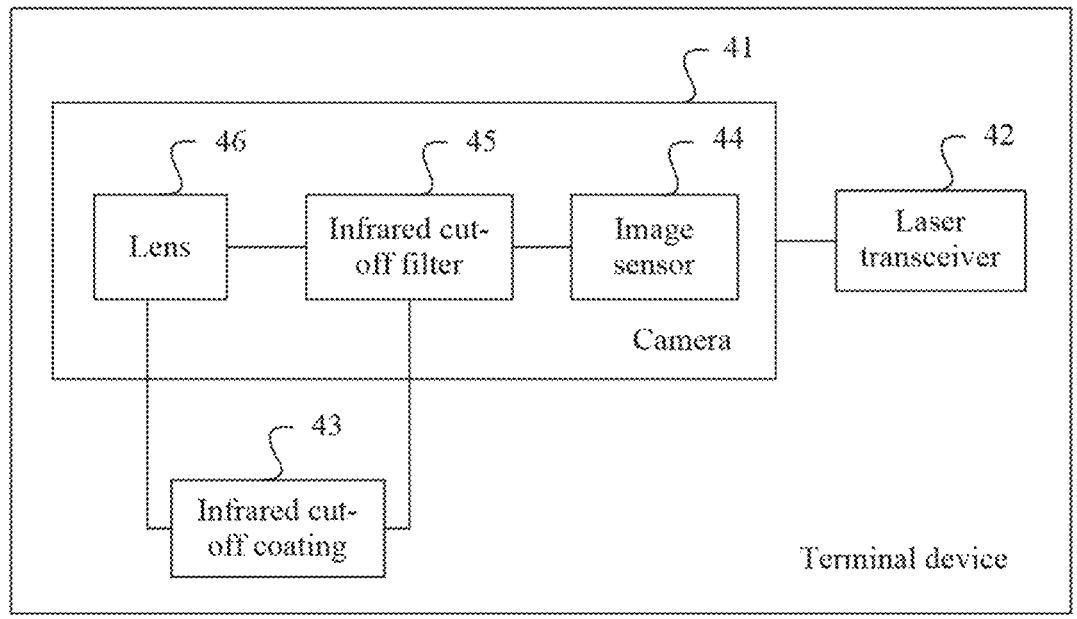
FIG. 10 is a schematic structural diagram of a terminal device according to Embodiment 2 of this application.
Figure 11:
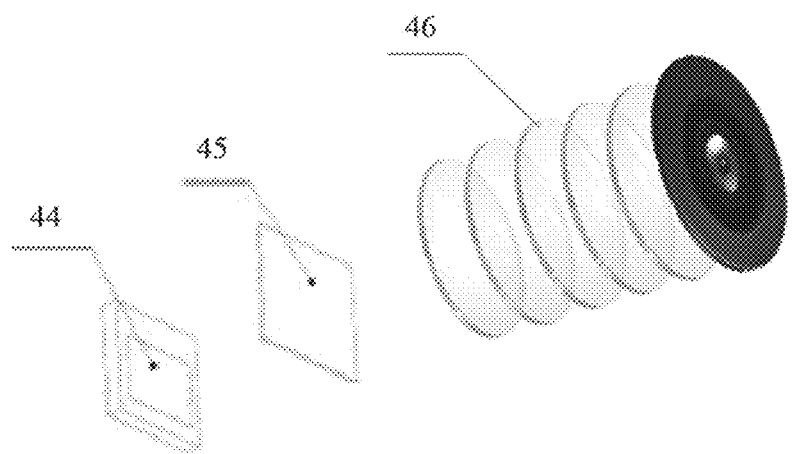
FIG. 11 is a schematic structural diagram of a camera according to Embodiment 2 of this application.

FIG. 10 is a schematic structural diagram of a terminal device according to Embodiment 2 of this application. FIG. 11 is a schematic structural diagram of a camera according to Embodiment 2 of this application. As shown in FIG. 10 to FIG. 11, the terminal device provided in this embodiment of this application may include a camera 41, a laser transceiver 42, and an infrared cut-off coating 43.

The camera 41 may include an image sensor 44, an infrared cut-off filter 45, and a lens 46, where the infrared cut-off filter 45 is located between the image sensor 44 and the lens 46.

The image sensor 44 is configured to: receive an optical signal penetrating the lens 46 and the infrared cut-off filter 45, and convert the optical signal into an electrical signal.

The laser transceiver 42 is configured to transmit or receive a laser.

The infrared cut-off coating 43 is located on at least one surface of the infrared cut-off filter 45, and a cut-off wavelength of the infrared cut-off coating 43 is corresponding to a center wavelength of the laser transmitted by the laser transceiver 42.

Specifically, the infrared cut-off coating is disposed in the terminal device provided in this embodiment, and the infrared cut-off filter is disposed in the camera. The infrared cut-off coating may be disposed on the infrared cut-off filter. The infrared cut-off filter has two surfaces: an inner surface and an outer surface. The infrared cut-off coating may be disposed only on one surface of the infrared cut-off filter, or may be disposed on both the inner surface and the outer surface of the infrared cut-off filter. The cut-off wavelength of the infrared cut-off coating is corresponding to the center wavelength of the laser transmitted by the laser transceiver. Therefore, a laser that is on an infrared band and that arrives at the image sensor after penetrating the lens and the infrared cut-off filter may be filtered, so as to weaken a red laser spot phenomenon.

It should be noted that a material and an implementation technology of the infrared cut-off coating 43 are not limited in this embodiment.

It should be noted that a quantity of the infrared cut-off filters 45 is not limited in this embodiment. If there are a plurality of infrared cut-off filters 45, the infrared cut-off coating 43 may be disposed on any quantity of infrared cut-off filters 45 in the plurality of infrared cut-off filters 45.

Optionally, if an infrared cut-off coating 43 covers only one surface of the infrared cut-off filter 45, the infrared cut-off coating 43 covering the only one surface is an infrared cut-off (Infrared cutting, IR) coating. If infrared cut-off coatings 43 cover two surfaces of the infrared cut-off filter 45, the infrared cut-off coatings 43 covering the two surfaces are respectively the IR coating and an anti-reflection (Anti-reflection, AR) coating, or are both IR coatings.

Optionally, the infrared cut-off coating 43 covering the at least one surface of the infrared cut-off filter 45 is multi-layer.

By disposing the multilayer infrared cut-off coating, an effect of filtering the laser on the infrared band may further be improved, and the red laser spot phenomenon is further weakened.

Optionally, the infrared cut-off coating 43 may cover at least one surface of the lens 46.

It should be noted that a quantity of the lenses 46 is not limited in this embodiment. If there are a plurality of lenses 46, the infrared cut-off coating 43 may be disposed on any quantity of lenses 46 in the plurality of lenses 46.

Optionally, a transmittance of the infrared cut-off coating 43 on a near-infrared band is equal to or less than $10^{-3}$.

By setting the transmittance of the infrared cut-off coating 43 on the near-infrared band to be equal to or less than $10^{-3}$, the effect of filtering the laser on the infrared band may further be improved, and the red laser spot phenomenon is further weakened.

Optionally, the cut-off wavelength of the infrared cut-off coating 43 is greater than or equal to 780 nm and is less than or equal to 1100 nm.

Optionally, the cut-off wavelength of the infrared cut-off coating 43 is 840 nm or 900 nm.

Optionally, the terminal device provided in this embodiment may further include a protection glass. The protection glass is disposed in front of the lens, and is configured to protect the lens. The infrared cut-off coating may cover at least one surface of the protection glass.

It should be noted that the terminal device provided in this embodiment may further include the focusing apparatus provided in the embodiment shown in FIG. 6.

This embodiment of this application provides a terminal device, including the camera, the laser transceiver, and the infrared cut-off coating, where the cut-off wavelength of the infrared cut-off coating is corresponding to the center wavelength of the laser transmitted by the laser transceiver. By disposing the infrared cut-off coating on the at least one surface of the infrared cut-off filter in the camera, the laser that is on the infrared band and that arrives at the image sensor after penetrating the lens and the infrared cut-off filter may be filtered. This weakens the red laser spot phenomenon and improves photographing quality.

What is claimed is:

1. A terminal device, comprising:
   a camera comprising an image sensor and N lenses, wherein N is greater than one, wherein the image sensor is disposed at the rear of the N lenses, and wherein the image sensor is configured to:
      receive an optical signal penetrating a protection glass of the terminal device and the N lenses, wherein the protection glass is disposed in front of the N lenses and is configured to protect the N lenses; and
      convert the optical signal into an electrical signal,
   a laser transceiver configured to transmit and receive a laser beam; and
   infrared cut-off coatings located on two surfaces of the protection glass and lenses, wherein a cut-off wavelength of the infrared cut-off coatings corresponds to a center wavelength of the laser beam.

2. The terminal device of claim 1, wherein an infrared cut-off coating is multi-layer.

3. The terminal device of claim 1, wherein the cut-off wavelength of an infrared cut-off coating is greater than or equal to 780 nm and is less than or equal to 1100 nm.

4. The terminal device of claim 1, wherein the cut-off wavelength of an infrared cut-off coating is 840 nm or 900 nm.

5. The terminal device of claim 1, wherein a transmittance of an infrared cut-off coating on a near-infrared band is equal to or less than $10^{-3}$.

6. The terminal device of claim 1, wherein the infrared cut-off coatings cover two surfaces of a lens.

7. The terminal device of claim 1, wherein the infrared cut-off coatings cover two surfaces of the infrared cut-off filter.

8. The terminal device of claim 1, wherein the terminal device is configured to cause the camera to perform photographing according to the photographing instruction to obtain a picture.

9. The terminal device of claim 1, wherein the terminal device is configured to cause the camera to perform recording according to the recording instruction to obtain a video.

10. A terminal device, comprising:
    a laser transceiver configured to:
       transmit a laser beam; and
       receive a reflection of the laser beam;
    a camera comprising:
       a lens;
       an infrared cut-off filter in alignment with the lens;
       infrared cut-off coatings located on two surfaces of the infrared cut-off filter and lens, wherein a cut-off wavelength of the infrared cut-off coatings corresponds to a center wavelength of the laser beam transmitted and received by the laser transceiver; and
       an image sensor, wherein the image sensor is configured to receive an optical signal penetrating the lens and the infrared cut-off filter and convert the optical signal into an electrical signal.

11. The terminal device of claim 10, wherein an infrared cut-off coating covers only one surface of the infrared cut-off filter.

12. The terminal device of claim 10, wherein an infrared cut-off coating is multi-layer.

13. The terminal device of claim 10, wherein an infrared cut-off coating covers a surface of the lens.

14. The terminal device of claim 10, wherein a transmittance of an infrared cut-off coating on a near-infrared band is equal to or less than $10^{-3}$.

15. The terminal device of claim 10, wherein the infrared cut-off coatings cover two surfaces of a lens.

16. The terminal device of claim 10, wherein the infrared cut-off coatings cover two surfaces of the infrared cut-off filter.

17. The terminal device of claim 10, wherein the camera is configured to:
   receive a photographing instruction; and
   perform photographing according to the photographing instruction to obtain a picture.

18. The terminal device of claim 10, wherein the camera is configured to:
   receive a recording instruction; and
   perform recording according to the recording instruction to obtain a video.

19. The terminal device of claim 10, wherein the cut-off wavelength of an infrared cut-off coating is greater than or equal to 780 nm, and is less than or equal to 1100 nm.

20. The terminal device of claim 10, wherein the cut-off wavelength of an infrared cut-off coating is 840 nm or 900 nm.

* * * * *